Dec. 17, 1968  K. EICKMANN  3,416,460
FLUID HANDLING DEVICE INCLUDING ENDWALLS ON
A TROCHOID CURVED BODY
Original Filed Dec. 5, 1963  2 Sheets-Sheet 1

INVENTOR:
KARL EICKMANN
BY *Michael S. Striker*
*Attorney*

Dec. 17, 1968  K. EICKMANN  3,416,460
FLUID HANDLING DEVICE INCLUDING ENDWALLS ON
A TROCHOID CURVED BODY
Original Filed Dec. 5, 1963  2 Sheets-Sheet 2
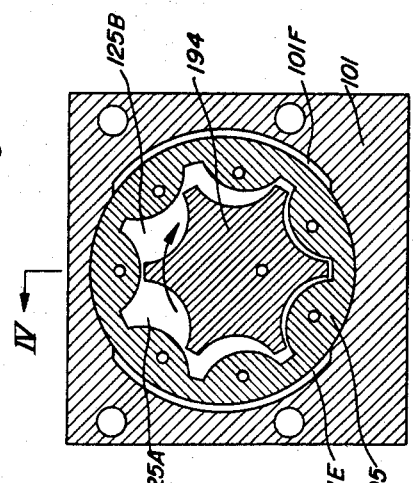
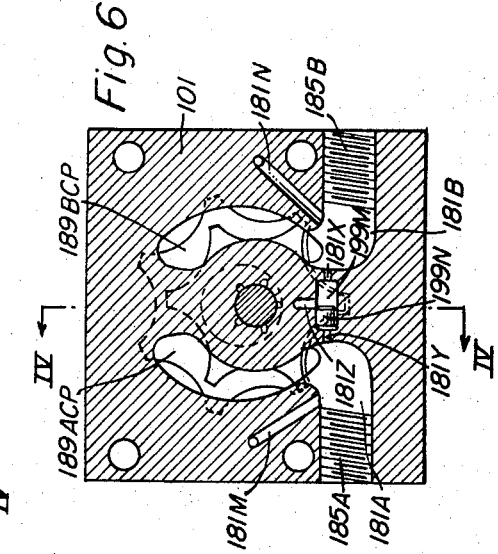
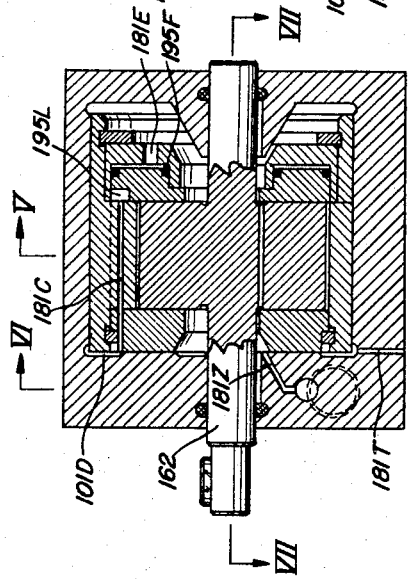
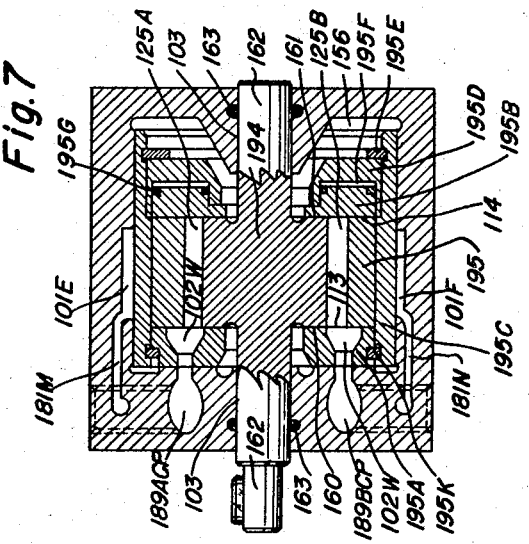
INVENTOR.
KARL EICKMANN
BY United States Patent Office 3,416,460
Patented Dec. 17, 1968

3,416,460
FLUID HANDLING DEVICE INCLUDING END-WALLS ON A TROCHOID CURVED BODY
Karl Eickmann, 2420 Isshiki, Hayama-machi, Kanagawa-ken, Japan
Original application Dec. 5, 1963, Ser. No. 328,395, now Patent No. 3,320,898, dated May 23, 1967. Divided and this application May 22, 1967, Ser. No. 640,143
9 Claims. (Cl. 103—126)

ABSTRACT OF THE DISCLOSURE

Side walls rotating with one gear rotor slide on another gear rotor and are held in sealing contact by a balancing chamber.

---

This invention relates to fluid handling devices which operate for example as fluid-pumps, fluid-motors, combustion engines, air-motors or steam-motors or otherwise.

More in detail the invention relates to fluid handling devices wherein at least two gear rotors which are eccentrically located respectively to each other and form trochoid working spaces.

This is a divisional of my co-pending patent application S.N. 328,395 of Dec. 5, 1963, now Patent No. 3,320,898.

It has been known in the past to provide a pair of trochoid curved gear rotors, whereof one of the gear rotors of the pair of bodies is eccentrically located of the other and where working chambers or spaces are formed between said rotors.

In those known machines however, one of the gear rotors moves along the housing walls with close clearance between faces of the housing walls and body ends, thereby causing friction and leakage of fluid through the clearance between said walls. Said friction and leakage narrow the power and efficiency of such known machines.

It is the intention of this invention ot reduce the relative velocities between end faces of rotors and thereon abutting faces of fluid handling devices and also to reduce the leakage therebetween in order to improve the efficiency and power of the fluid-handling devices.

In accordance with the preferred embodiment, side walls of one gear rotor slide on the other gear rotor and are held in sealing contact by pressure fluid in a balancing chamber.

The present invention will be best understood from the following description of the drawings in which:

FIGURE 4 is a longitudinal sectional view through another embodiment of this invention which also represents a rotary trochoid piston machine and which is taken along the line IV—IV of FIGURE 3.

FIGURE 5 is a cross-sectional view through FIGURE 4 taken along the line V—V.

FIGURE 6 is the cross-sectional view through FIGURE 4 taken along the line VI—VI.

FIGURE 7 is a longitudinal sectional view through FIGURE 4 along the line VII—VII.

Figure 3:
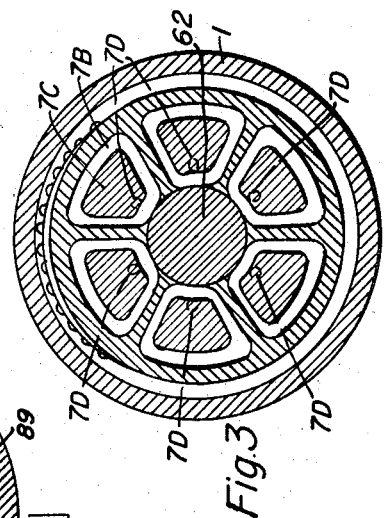
FIGURE 3 is a cross-sectional view through FIGURE 1 along the line III—III.
Figure 2:
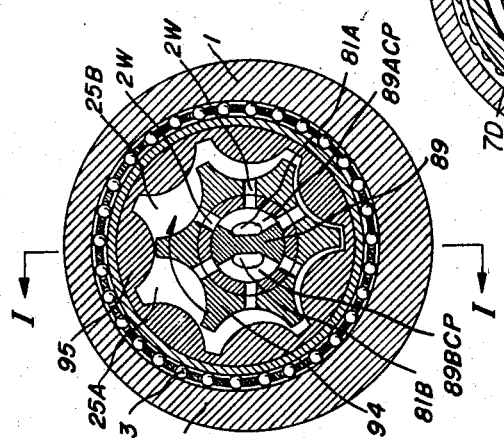
FIGURE 2 is a cross-sectional view through FIGURE 1 taken along the line II—II.
Figure 1:
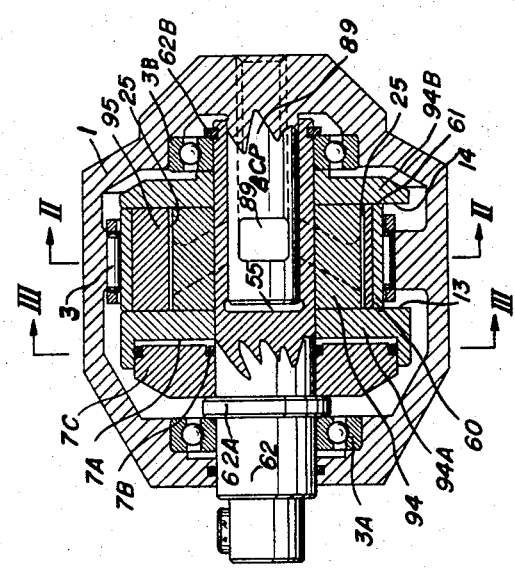
FIGURE 1 is a longitudinal sectional view through an other embodiment of the rotary fluid machine of this invention which represents a trochoid piston machine and which is a cross-sectional view through FIGURE 2 along the line I—I.

The fluid rotary machine of FIGURES 1 to 3 represents a first embodiment.

The machine may act as a fluid-motor or may also act as a fluid pump. The trochoid type fluid machine is provided inside of a casing 1.

The fluid machine consists mainly of an inner trochoid gear rotor 94 and of an outer trochoid gear rotor 95. Between the inner trochoid gear rotor and the outer trochoid gear rotor 94 and 95 is the working space or working chamber 125 of the machine provided.

The outer trochoid rotor of this embodiment of the invention is borne in antifriction bearing 3 and is able to rotate therein. The inner trochoid rotor 94 is borne by the shaft or rotary shaft 62. The rotor or shaft 62 is borne in antifriction bearing 3A and 3B. A radial eccentricity is present between the axis of the shaft of rotor 62 and the axis of the outer trochoid rotor 95.

Fluid entrance and fluid exit ports may be provided on the outer trochoid rotor 95 or on the inner trochoid rotor 94 or on a side wall or side walls thereon.

In the embodiment of FIGURES 1 to 3 shaft 62 or inner trochoid rotor is provided with a rotor center bore 55. A control shaft 89 is fitted in the said rotor bore 55 and provided with fluid entrance and exit passage 81A and 81B and also with control ports 89ACP and 89BCP.

In the example of an embodiment the inner trochoid rotor 94 is provided with rotor passages or rotor fluid windows 2W. The said rotor windows 2W are cooperating with the respective control ports 89ACP or 89BCP. The said rotor windows are extending through shaft 62 or inner trochoid rotor 94 or through both of them and they are connecting the trochoid piston space or working chamber 25A or 25B with the respective control port 89ACP or 89BCP. The rotor windows 2W, the control ports 89ACP and 89BCP and the fluid passages 41A and 41B are provided in order to assure the flow of fluid into or out of the trochoid piston type rotary fluid machine. If the rotor or rotors of the fluid machine rotates or rotate in the direction of the arrow of FIGURE 2 and if the fluid machine acts as a pump, then fluid will be subtracted through fluid passage 81A and control port 89ACP and through the respective rotor windows 2W into the enlarging working chamber 25A and fluid will be expelled from the decreasing working chamber 25B through the respective rotor window 2W and control port 89BCP and fluid passage 81B out of the trochoid piston fluid machine.

If the trochoid piston fluid machine acts as a fluid motor then the high pressure fluid will be supplied through fluid passage 81A and control port 89ACP and the respective rotor windows 2W into the increasing working chamber 25A and the less pressure fluid will be passed out from the decreasing working chamber 25B through the respective rotor windows 2W and through the control port 89CP and fluid passage 81B out of the fluid machine.

If the trochoid piston type fluid machine acts as a fluid pump or fluid motor in a direction contrary to the arrow of FIGURE 2 then the flow of fluid will be reversed to the heretofore described directions.

The sealing between the high pressure working chamber 25A or 25B and the other respective low pressure working chamber 25A or 25B is due to the eccentricity of the axis of the inner trochoid rotor and the outer trochoid rotor 94 and 95 and due to the configuration of the inner and outer trochoid piston type curves of the said rotors. The said inner trochoid piston rotor 94 and the outer trochoid rotor 95 are so formed that at any angle of rotation a part of the outer face of the inner trochoid piston rotor fits on a respective part of the inner face of the outer trochoid rotor 95 and always so that at least two parts of the inner and outer faces of the inner trochoid rotor and the outer trochoid rotor 94 or 95 are sealing against each other and fitting against each other during stationary or rotary condition of the said trochoid piston type fluid machine.

In order to increase the sealing effect and thereby the volumetric efficiency and thereby the total efficiency in trochoid piston type fluid machines there are in accordance with the invention rotor side walls provided on the inner rotor or on the outer rotor of the trochoid piston fluid machine.

In the example of the embodiment here under discussion the rotor side walls 94A and 94B are provided on the axial ends on the inner trochoid rotor 94. The said rotor side walls 94A and 94B are provided with innermost side wall faces 13 and 14. The outer trochoid rotor 95 is provided with casing ring element having end faces 60 and 61 each one on its axial end. The casing element end faces 60 and 61 are fitted and sealing between the innermost side wall faces 13 and 14 of the side walls 94A and 94B inner trochoid rotor 94 and they are sliding thereagainst.

Consequently in accordance with this invention the outer trochoid rotor 95 is the enclosing body while the inner trochoid rotor 94 is the inner rotary body.

Due to the fact that both rotors, the inner trochoid rotor 94 and the outer trochoid rotor 95 are rotating, and that the rotor side walls 94A and 94B are also rotating the friction between the outer trochoid rotor 95 and the rotating side walls 94A and 94B of the inner trochoid rotor 94 in the trochoid piston type fluid machine of this invention will be very much narrower or less than the friction would be if the side walls of the fluid machine would be stationary.

The rotary side walls 94A and 94B of a trochoid piston type fluid machine are therefore an important feature of this invention.

The fact that the pressure in the fluid machine of this embodiment, here under discussion, can be very much increased due to very good sealing between the said casing element end faces 60 and 61 and the innermost rotor side wall faces 13 and 14 the pressure in the fluid machine might become so very high that the pressure out of the working spaces 25A or 25B might press the rotor side walls 94A and/or 94B in axial direction outwardly and thereby open a clearance between faces 13 and 14 and 60 and 61.

In order to prevent such widening of the rotor side wall casing clearance or to prevent elongation of the trochoid piston rotor, for instance the inner trochoid rotor 94, it is especially suitable in accordance with this invention to provide balancing means in the rotary parts of the rotary trochoid pistons.

For this purpose the rotary balancing chamber 7A is provided inside of one of the rotor side walls, for instance of rotor side walls 94A and closed by closure member 7C.

Instead of providing one rotary balancing chamber 7A there may also be a plurality of rotary balancing chamber parts 7A provided as demonstrated for instance in FIG. 3. The sealing means 7B may be provided around the respective rotary balancing chamber portion 7A in order to seal the respective rotary balancing chamber or rotary balancing chamber part or parts 7A against leakage out of it. The said rotary balancing chamber or the said parts of rotary balancing chamber 7A are closed in axial direction by the closure member 7C. The said rotary closure member 7C has a plurality of parts of fingers which extend into the rotary balancing chamber parts 7A. The rotary closure member 7C may extend into the respective rotary balancing recess 7A or of its parts and thereby into a recess in rotary side wall 94A.

The clearance between the inserted parts of the rotary closure member 7C and the respective parts of the rotor side wall 94 or 94A, or 94B and thereby the sealing of the respective rotary balancing chamber or chamber parts 7A may be sealed by the said sealing means 7B.

Fluid under pressure or fluid may be passed through the communication pasages 7D into the respective rotary balancing chamber or balancing chamber part 7A.

It is especially suitable in accordance with the embodiment here under discussion, that each one communication means 7D passes fluid from the adjacent part of the respective working chamber 25A or 25B into the respective part of the rotary balancing chamber 7A. In the embodiment here under discussion there are six fluid communication means 7D provided due to the fact that there are also six balancing chambers 7A and also six sealing means 7D. But there are or could be also another number of passage means or rotary balancing chamber means depending on the design and considerations.

The rotary closure member 7C is fastened and borne by the rotary flange shaft 62A and the rotary parts which are assembled on the rotary shaft 62 are fastened between the shaft flange 62A and the retaining or snap ring or fastening means 62B. The fastening means 62B may also consist of a divided ring and a surrounding means as well as, for instance, bolt means and nut means which might extend through the inner trochoid rotor. In the example of the embodiment here under discussion the flange means 62A and the retaining means 62B are keeping the rotary parts, especially the inner trochoid rotor 94 with its rotor side walls 94A and 94B and with the bearing means 5B and with the rotary balancing chamber 7A and the rotary enclosing member 7C together in axial direction.

In accordance with this invention the respective rotary balancing chamber or chambers parts 7A are so large dimensioned that they are larger than the section of the respective working chamber 25A or 25B. Consequently the pressure of fluid out from the working chambers 25A will act in axial direction against the rotor side wall 94A while the pressure of fluid out from the rotary balancing chamber 7A will act in oppositional axial direction.

Since the area of the rotary balancing chamber or chamber parts 7A is larger than the sectional area through the working chamber 25A or 25B the force of fluid out from the rotary balancing chamber 7A or its parts will be stronger in axial direction than the forces of fluid out from the said working chamber or chambers 25A or 25B. Consequently the forces of fluid out from the rotary balancing chamber 7A press the rotary parts like the inner rotor 94 and the rotor side walls 94 and 94B together in axial direction, thereby preventing any enlargement of the rotor side wall casing clearance and on the contrary they are providing the decrease of the rotor side wall casing clearance substantially proportional to the pressure in the working chambers and the rotary balancing chambers 7A.

Another embodiment of this invention is demonstrated in FIGURES 4, 5, 6, and 7. These or this embodiment shows also a rotary trochoid piston type fluid machine which might also act as a rotary fluid motor or as rotary fluid pump. It differs from the embodiment of FIGURES 1 to 3 therein that the rotary side walls are not provided on the trochoid inner rotor but that they are provided on the outer trochoid rotor. It differs from the said embodiment further therein that the fluid passages are not in a control body which is mounted in rotor bore but the fluid is supplied into the respective working chamber in axial direction.

The shaft 162 is borne in casing 101 and able to rotate therein in bearing 163. Passages for fluid are also supplied in order to lubricate the slide bearing 103. Sealing means 63 for sealing the casing inner space against the outside are also provided. They are sealing an inner space 156 against the outside.

The shaft 162 may be integral with the inner trochoid rotor 194. The inner trochoid rotor 194 may be provided with a casing element having end faces 160 and 161. The outer trochoid rotor 195 may surround the inner trochoid rotor 194.

The outer trochoid rotor 195 is in accordance with this embodiment of the invention provided with rotor side walls 195A and 195B which are rotating together with the outer trochoid rotor 195 and which are fastened thereon. The rotor side walls 195A and 195B are provided with innermost side wall spaces 113 and 114. The casing element end faces 160 and 161 abut the same, sliding therealong fitting thereon and sealing against the innermost side wall faces 113 and 114 of outer trochoid rotor 195.

Thereby the working spaces 125A and 125B are formed between the outer trochoid rotor 195 and the inner trochoid rotor 194 and the rotor side walls 195A and 195B.

The outer trochoid rotor 195 may be inserted into a rotary casing 195C and fastened inside of the rotary case 195C by retaining means 195K and 195E.

One of the rotor side walls, for instance the rotor side wall 195B, may be provided with a rotary closure member 195D and with a rotary balancing chamber 195F in order to prevent enlargement of the rotor side wall clearance. Sealing means 195G may be provided between the rotor side wall 195B and the rotary closure member 195D in order to seal the rotary balance chamber or its parts 195F against leakage.

The rotary closure member 195D may also be fastened within the rotary casing 195C and also retained by the retaining means 195E within the said rotary casing 195C and fastened therein.

Thus, the forces of fluid inside of the rotary balancing chamber may act axially outwardly against the closure member 195D but the closure member 195D is prevented from axial movement out of the rotary casing 195C by the retaining means 195D and/or 195K.

Fluid under pressure may be passed into the rotary balancing chamber 195F, for instance, by fluid passage or communication means 181E and therefore the forces of fluid from the rotary balancing chamber 195F or its parts forces the rotor side wall 195B in axial inwards direction against the respective rotor or enclosing body or casing element end faces 160 or 161 and may thereby narrow the rotor side wall casing clearance substantially proportional to or with increase of pressure in the rotary fluid machine.

In the embodiment here under discussion the high pressure fluid may be passed out from the working chamber which is under higher pressure into the intercasing space 156.

This passage of high pressure fluid into the inter-casing space 156 may be, according to this embodiment of this invention, controlled by the control piston 199N which is present in control cylinder 199M.

As shown in FIG. 6, fluid may be passed into one or the other end of the control cylinder 199M by the fluid passage 181X or 181Y out from the fluid passage 181A or 181B and may thereby force the control piston 199N into one or the other end position within the control cylinder 199M. Thereby, the fluid under high pressure will always be passed through communication means 181Z into the intercasing-space 156.

Rotor windows 102W may be provided, for instance through one of the rotor side walls as shown in FIGURE 7 inside of rotor side wall 195A. The control ports 189ACP and 189BCP may be provided inside of or on a part of a casing 101.

The fluid passages 181A and 181B may be provided for communication between control ports 181ACP and connection port 185A or between control port 184BCP and connection port 185B.

Thus if the rotary parts of the fluid machine rotate in the direction of the arrow of FIG. 5 then fluid will pass from connection port 189A through fluid passage 181A and through control port 189ACP into the enlarging trochoid chamber 125A while fluid will pass out of the decreasing trochoid chamber 125B through control port 189BCP, fluid passage 181B and connection port 182.

If the rotors rotate in the opposite direction the flow of fluid of the fluid machine will be reversed.

It is necessary that the rotor or rotor side wall 195A will always be pressed with its control surface against the control surface of its respective casing 101.

For this purpose the low pressure space or low pressure chamber 181B may be provided in a part of a casing 101. The low pressure fluid may pass into the space 181D under less pressure for instance, from the atmosphere through the respective connection passage 181T into the said low pressure space 181D.

Additional passage means 181C may extend through the outer trochoid rotor into respective low pressure chambers or low pressure areas 195L into rotary parts. On the contrary high pressure may be present in the inter-casing space 156.

The fluid under high pressure in inter-casing space 156 will press control surfaces of rotor side wall 195A and of casing 101 against each other due to the fact that the area of the rotary parts which is on one end abutted against the inter-casing space 196 is larger than the area under high pressure on the other axial end because the higher pressure area on the other end is narrowed by the low pressure space 101D.

The trochoid rotor, for instance, the outer trochoid rotor or the rotary casing 195C is borne by stationary slide bearings or fluid bearings and balanced therein.

For this purpose the balancing spaces 101E and 101F are provided inside of the casing 101.

The fluid from the fluid passage 181A passes through communication means or communication passage 181M into the respective balancing recess 101F. The fluid out from the fluid passage 181B through communication passage 181N into the balancing recess 101E. Therefore the pressure of fluid which is acting in the working space 125A is also supplied through the respective rotor window, the respective control port, the respective fluid passages and the respective communication passage into the adjacent balancing recess 101E.

The pressure of fluid present in the working chamber 125B is also present inside of balancing recess 101F because it is passed thereinto via the respective rotor window, the respective control port, the respective fluid passage and the respective communication passage.

Therefore the forces of fluid from the working chamber 125A acting to the left are balanced out by forces of fluid from the intervane space 101E which are acting to the right on the rotary casing 195C or on the respective outer trochoid piston rotor 195. The forces of fluid which are acting from the working space 125B to the right in FIGURE 1 against the outer trochoid rotor 195 are balanced by the forces of fluid which are acting out of the balancing recess 101F to the left of FIGURE 5 against the outer trochoid rotor 195.

Consequently, if the balancing recesses 101E and 101F are suitably dimensioned and suitably located then the forces of fluid which are acting out of the fluid chambers 125A and/or 125B against the outer trochoid rotor and its therewith rotating side wall parts or its therewith rotation or rotating rotary case 195C and the forces of fluid out of the balancing recesses 101E and 101F against the said outer trochoid rotor and its parts may be partially or totally balanced.

In the case of total balancing the outer trochoid rotor and the therewith rotating parts are floating between forces of fluid under pressure and consequently every load in a radial direction will be entirely prevented and thereby mechanical friction of slide under load between the outer trochoid rotor 195 and the casing 101 or respective parts is thereby partial or almost or totally prevented in accordance with this embodiment of the invention.

Therefore in this embodiment of the invention, not only friction is reduced between the trochoid rotors and stationary side walls, but also friction is reduced between the rotary trochoid rotors and the respective stationary casing 101. Similar balancing recess 101E or 101F could also be applied for bearing the inner trochoid rotor 194 or its shaft in the casing 101.

Consequently, the friction in rotary trochoid piston type fluid machines is substantially decreased, while the total efficiency is thereby notably increased and the fluid machine of this embodiment is very simple in design, simple in manufacturing and assures a long life.

Instead of fastening the rotor side walls 195A and 195B on the outer trochoid rotor by retaining ring means 195A and 195B it would also be possible to fasten the rotor side walls on the outer trochoid rotor or in the rotary case by bolt means or other fastening means or the like.

It is possible to interchange parts of one embodiment of the invention with others or to do similar or other modifications, since the embodiments shown in the figures demonstrate examples of the invention only. Those modifications are within the scope of this invention. It is therefore intended that the patent shall cover whatever novelty resides in the invention, and that the invention shall be limited only by the appended claims.

What is claimed is:

1. Rotary fluid handling apparatus, comprising, in combination, casing means; an inner rotor means having outer teeth; an outer rotor means surrounding said inner rotor means and having inner teeth meshing with said outer teeth; mounting means supporting said inner and outer rotor means in said casing means for rotation about two parallel axes in a position in which said inner and outer teeth mesh so that a high pressure chamber and a low pressure chamber is formed between said inner and outer rotor means; first and second side walls connected with one of said rotor means for rotation with the same and relative to the respective other rotor means, said first and second side walls being located at the axial ends of said inner and outer rotor means and having annular inner sealing faces in sliding and sealing contact with said other rotor means for closing said high and low pressure chambers, said first side wall abutting said casing means for supporting said inner and outer rotor means in one axial direction of movement; a closure means mounted for axial movement relative to said second side wall and being supported against axial movement in the axial direction opposite said one axial direction, said closure means forming with said second side wall a balancing chamber, said balancing chamber communicating with said high pressure chamber so that high pressure fluid in said balancing chamber urges said second side wall, said inner and outer rotor means, and said first side wall in said one axial direction whereby said annular inner sealing faces fluidtightly slide on said other rotor means.

2. Apparatus as claimed in claim 1 wherein said side walls are connected with said inner rotor means for rotation, and wherein said annular sealing faces thereof engage annular surfaces on opposite sides of said outer rotor means.

3. Apparatus as claimed in claim 2 wherein said outer rotor means includes a rotor having said inner teeth, and a casing ring surrounding said rotor and being secured to the same, said casing ring having said annular surfaces engaged by said sealing faces.

4. Apparatus as claimed in claim 1 wherein said side walls are connected with said outer rotor means for rotation, and wherein said annular sealing faces thereof engage annular surfaces on opposite sides of said inner rotor means.

5. Apparatus as claimed in claim 1 wherein said second side wall has a recess in which said closure means is partly located for forming in said recess said balancing chamber.

6. Apparatus as claimed in claim 1 wherein said closure means has a recess in which said second rotor side wall partly is located for forming in said recess said balancing chamber.

7. Apparatus as claimed in claim 1 wherein said second side wall is formed with ducts therethrough connecting said high pressure chamber with said balancing chamber.

8. Apparatus as claimed in claim 1 wherein said second side wall has a recessed face confronting said closure means and forming said balancing chamber; and wherein said closure means has a plurality of projections located in said recess and dividing said balancing chamber into a plurality of spaces; and comprising sealing means surrounding said spaces.

9. Apparatus as claimed in claim 1 wherein said side walls are connected with said inner rotor means for rotation, wherein said annular sealing faces thereof engage annular surfaces on opposite sides of said outer rotor means; wherein said inner rotor means includes a shaft supported in said casing means for rotation, said shaft having a flange abutting said casing; and wherein said closure means is mounted on said shaft abutting said flange in said opposite axial direction.

References Cited
UNITED STATES PATENTS

| | | |
|---|---|---|
| 2,044,873 | 6/1936 | Beust. |
| 2,434,135 | 1/1948 | Witchger. |
| 2,490,115 | 12/1949 | Clarke. |
| 2,762,195 | 9/1956 | Nubling. |
| 2,809,592 | 10/1957 | Miller et al. |
| 2,853,952 | 9/1958 | Aspelin. |
| 2,915,982 | 12/1959 | Crandall. |
| 2,988,065 | 6/1961 | Wankel et al. |
| 3,034,448 | 5/1962 | Brundage. |
| 3,233,552 | 2/1966 | Kinnavy. |

FRED C. MATTERN, JR., *Primary Examiner.*

WILBUR J. GOODLIN, *Assistant Examiner.*

U.S. Cl. X.R.

103—216